United States Patent [19]
Eastmond et al.

[11] Patent Number: 4,541,118
[45] Date of Patent: Sep. 10, 1985

[54] SSB SYSTEM WITH PILOT CODED SQUELCH

[75] Inventors: Bruce C. Eastmond, Downers Grove, Ill.; Julian H. Richardson, Clevedon, England

[73] Assignee: Motorola, Inc., Schaumburg, Ill.

[21] Appl. No.: 564,815

[22] Filed: Dec. 22, 1983

[51] Int. Cl.$^3$ .................. H04B 7/00; H04B 1/04; H04B 1/16

[52] U.S. Cl. .................. 455/35; 455/45; 455/59; 455/70; 455/102; 455/110; 455/212; 455/228

[58] Field of Search .............. 455/35, 36, 45–47, 455/59, 61, 63, 68, 70, 102, 109, 110, 203, 212, 218, 219, 221, 228, 229; 370/11

[56] References Cited

U.S. PATENT DOCUMENTS

| | | |
|---|---|---|
| 2,699,494 | 1/1955 | Albricht .................. 455/47 |
| 2,757,239 | 7/1956 | Patton .................... 455/70 |
| 3,042,867 | 7/1962 | Thompson ............... 455/47 |
| 3,084,328 | 4/1963 | Groeneveld .............. 455/46 |
| 3,100,871 | 8/1963 | Richardson et al. . |
| 3,358,234 | 12/1967 | Stover . |
| 4,019,140 | 4/1977 | Swerdlow . |
| 4,165,486 | 8/1979 | Yoshisato . |
| 4,217,661 | 8/1980 | Kawn . |

OTHER PUBLICATIONS

R. W. Gibson & R. Wells, "The Potential of SSB for Land Mobile Radio", 29th IEEE VTG Conference, Mar. 1979.
R. W. Gibson, "Land Mobile SSB: Promises and Problems".
P. H. Jacobs, "Improving Spectrum Efficiency with ACSB", Communications, Mar. 1981.
Taub & Schilling, Principles of Communications Systems, McGraw-Hill Book Co., 1971, pp. 140–142.
IEEE Standard Dictionary of Electrical and Electronics Terms, John Wiley & Sons, 1972, pp. 231–232.

*Primary Examiner*—Jin F. Ng
*Attorney, Agent, or Firm*—James W. Gillman; Donald B. Southard; Raymond A. Jenski

[57] ABSTRACT

A single sideband communications system conveying a message through a transmitter to one or more predetermined receivers which are enabled by a coded squelch signal unique to the predetermined receivers is disclosed. The transmitter comprises means to angle modulate both the pilot signal and the information bearing single sideband signal with the coded signal at a predetermined deviation and to transmit the resulting signal.

Each receiver frequency control means tracks the frequency excursions of a selected portion of the transmitted signal up to predetermined limits so that the message can be demodulated without frequency distortion being introduced. Each receiver demodulates the coded squelch without interfering with the message demodulation or tracking functions and activates the receiver squelch of those preselected receivers.

36 Claims, 7 Drawing Figures

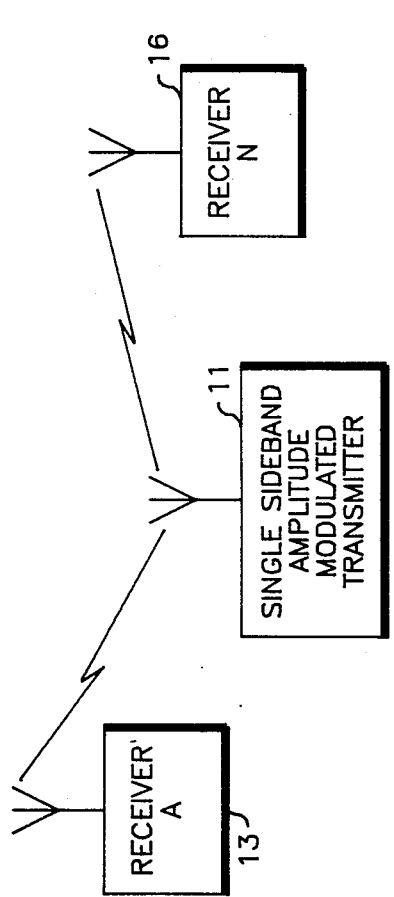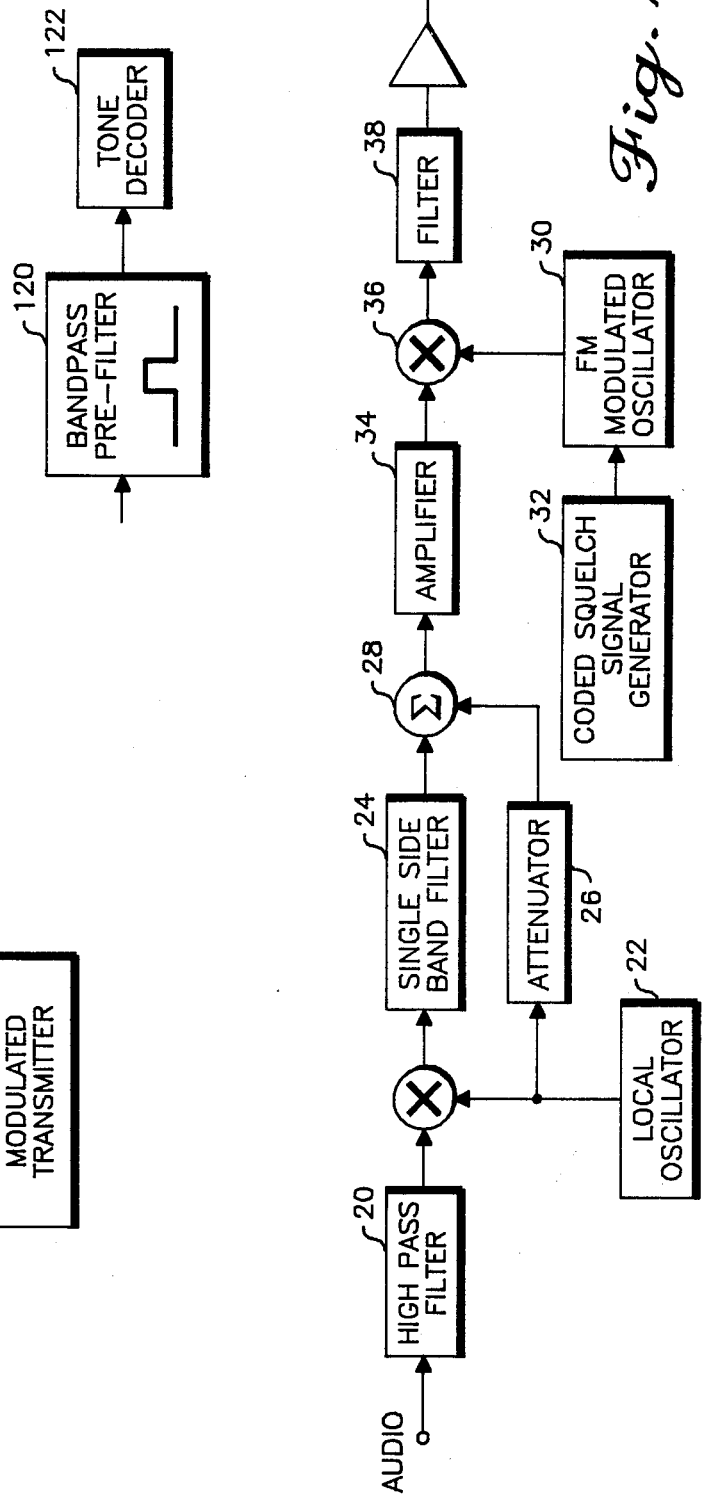

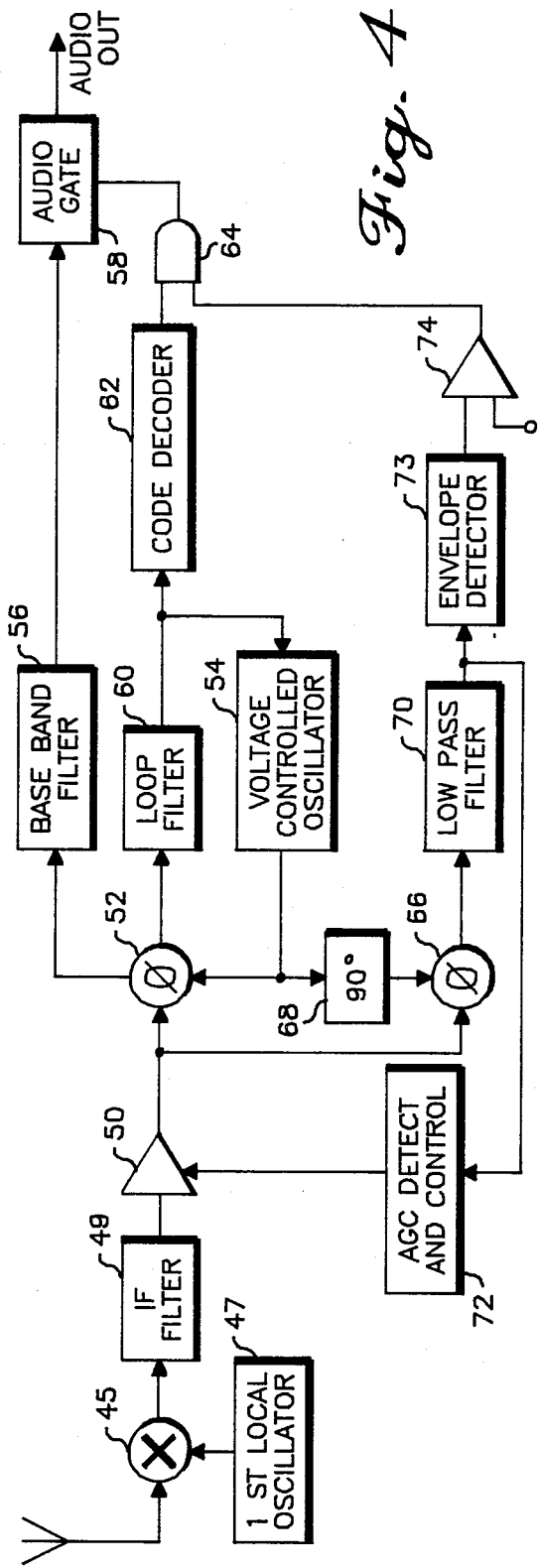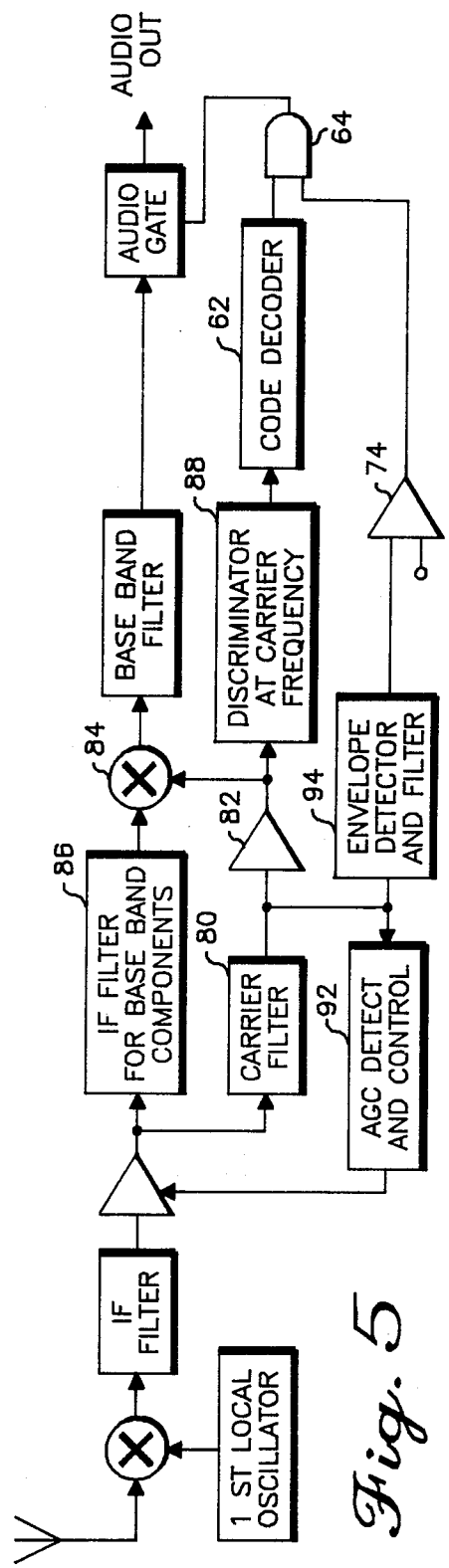

SSB SYSTEM WITH PILOT CODED SQUELCH

BACKGROUND OF THE INVENTION

This invention relates generally to the control of single sideband communications systems and more particularly to coded squelch transmission and coded squelch receiver enablement in a single sideband system.

Single sideband (SSB) modulation of radio frequency carriers has been known and used for many years. Its principal advantage is a reduction in occupied bandwidth over amplitude modulation or angle modulation. SSB is, in reality, amplitude modulation with a carrier and one of the two sidebands suppressed, utilizing only one sideband to convey information from the transmitter to the receiver. The receiver, to demodulate the SSB signal, must recreate the suppressed carrier with the same frequency and phase relationship to the single sideband as that of the original carrier in order to prevent distortion of the demodulated information. Voice information is tolerant of some frequency error in the recreated carrier and empirical studies have indicated that "natural" speech is obtained in receivers having a frequency error of less than 20 Hz. Frequency errors greater than this result in the characteristic "Donald Duck" or "Monkey chatter" speech frequency distortion of an untuned single sideband receiver.

To further complicate SSB reception, the strength of the radio frequency signal received by a receiver varies with propagation conditions which can change rapidly at VHF and UHF frequencies. These variations in radio frequency signal level result in corresponding variations in the detected audio level, causing a degradation of intelligibility in the recovered signal. Consequently, automatic gain control (AGC) circuits are routinely provided in single sideband receivers to maintan a constant recovered signal level.

Commercial and amateur radio operators are familiar with the fine tuning required to maintain an acceptable frequency error. Citizen's band radios introduced a greater segment of the public to the "clarifier" control of single sideband citizen's band radios which allows the manual adjustment of the receiver frequency of a crystal controlled radio. To make frequency control easier for other operators who do not want the annoyance of a manual control, an automatic frequency control (AFC) has been developed employing a "pilot" signal to establish a frequency reference.

The pilot signal is transmitted continuously with the single sideband message and is used by the receiver to vary the frequency of an internal mixing signal to track and eliminate any frequency variation imposed on the single sideband signal by either the transmission medium or the system. The pilot may also be used as a reference signal for the Automatic Gain Control. The gain of the receiver amplifying circuitry is adjusted so as to maintain a constant detected pilot level which thereby ensures that the audio output from the receiver does not vary.

The pilot signal may be a "zero-frequency" carrier or an audio tone within the modulation bandwidth. The generation of a carrier pilot is simply done by providing a controlled leakage path around the transmitter sideband filter. This leakage is typically adjusted to a level 5-15 decibels below the peak sideband power. The audio tone pilot requires a stable oscillator, the output of which is also typically set so as to produce a signal level which is set to be 5-15 decibels below the peak sideband power. The pilot signal should not interfere with the single sideband information nor should it constitute a significant part of the transmitter output power.

The SSB signal may experience frequency variations which are caused by equipment frequency offsets due to temperature drift, aging, and setting errors; shift due to relative motion of the transmitter and receiver (common in transmission between two aircraft); random frequency modulation due to multipath propagation between the transmitter and receiver; and purposeful variations intentionally introduced in the system. It is well known that these diverse forms of frequency variation may be "tracked" by a phase locked loop or other type of frequency tracking system, as long as the bandwidth of the frequency variation lies substantially within the bandwidth of the tracking circuit.

One feature of land mobile radio systems, which is valuable in directing communications to a selected one or group of users, is that of tone or digitally coded squelch. However, since the frequency spectrum of the coded squelch signal generally falls below the audio passband which begins at approximately 300 Hz, practical SSB filters employed in the suppression of the carrier and undesired sideband distort and suppress the coded squelch signal. Therefore, the transmission of the coded squelch signal at frequencies below the modulated passband is impractical in SSB transmitters. To resolve this difficulty, others have angle modulated and audio frequency pilot tone with the coded squelch signal. This, however, introduces a new set of problems.

A receiver typically utilized the pilot tone for AFC by phase-comparing the incoming pilot with an internal tone frequency reference. The control signal generated by the phase comparator is then used to vary the frequency of a local oscillator stage which drives a frequency convertor in the receiver. Since the pilot tone is also used for the coded squelch signal, the phase locked loop frequency response must be made lower (longer time constant) than the frequency of the coded squelch signal so that the AFC loop does not track the modulated coded squelch signal. Typical frequency response corners range over the decade of 2 Hz to 20 Hz. If this tracking were to occur, the coded squelch signal would be introduced into the demodulated single sideband message where audio mixing can produce undesirable in-band interference. A long time constant AFC loop, however, cannot track the higher frequency forms of undesirable frequency variations introduced by multipath signal propagation and therefore cannot eliminate them from the single sideband signal. Moreover, such an AFC system precludes the detection of digital NRZ FSK modulation, since the frequency response of this frequently-used form of modulation has its peak value at 0Hz. Consequently, the AFC time constant can never really be sufficiently low to avoid introducing undesirable in-band interference.

The present invention provides a means by which coded squelch signals can be transmitted together with a SSB voice signal in systems using either the carrier or an audio tone as a pilot signal. Others have previously used an angle modulated carrier in single side-band systems, but only for frequency control and purposes other than carrying information to be demodulated, decoded, and used by the receiver. The conditions under which coded squelch may be transmitted by a SSB system are disclosed hereinbelow.

SUMMARY OF THE INVENTION

Accordingly, one object of this invention is to utilize a modulated pilot signal to transmit a low frequency coded squelch signal in a single sideband system.

It is a further object of this invention to modulate both the pilot signal and the information bearing single sideband.

It is a further object of this invention to receive and detect the coded squelch signal without disturbance of the SSB information or the conventional control loops of the receiver.

These and other objects are achieved in a single sideband communications system conveying a message through a transmitter to one or more predetermined receivers which are enabled by a coded squelch signal unique to the predetermined receivers. The transmitter comprises means to angle modulate both the single sideband modulated message and pilot with the coded squelch signal at a predetermined deviation and transmit it to the receivers.

Each receiver incorporates means to track the frequency excursions of a selected portion of the transmitted signal including the pilot signal up to predetermined limits so that the message can be demodulated without frequency distortion being introduced. Each receiver demodulates the coded squelch without interference to the tracking or message demodulation functions and activates the receiver squelch of those preselected receivers.

BRIEF DESCRIPTION OF THE DRAWINGS

FIG. 1 graphically depicts a simplified single sideband radio system.

FIG. 2 is a block diagram of a single sideband transmitter employing pilot carrier transmission and including an aspect of the present invention.

FIG. 4 is a block diagram of one embodiment of a pilot carrier single sideband receiver which includes receiver portions of the invention.

FIG. 5 is a block diagram of an alternative embodiment of a pilot carrier single sideband receiver which includes receiver portions of the invention.

FIG. 7 is a block diagram of a tone coded squelch code decoder that can be used in any of the receiver embodiments.

DETAILED DESCRIPTION OF THE PREFERRED EMBODIMENT

Figure 3:
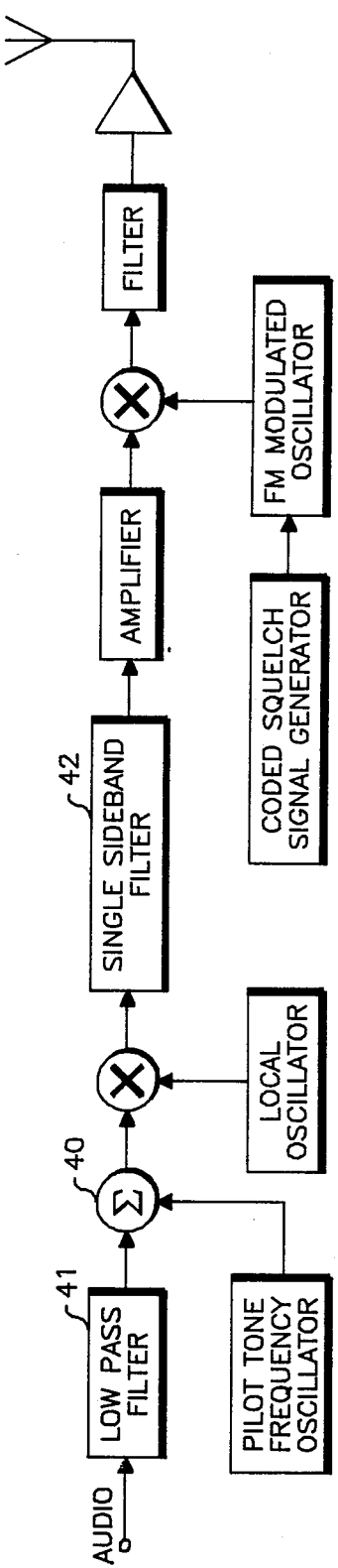
FIG. 3 is a block diagram of a single sideband transmitter employing pilot tone transmission, which includes an aspect of the present invention.

The preferred embodiment of this invention is a communications system which includes a single sideband transmitter capable of transmitting coded squelch signals by means of frequency modulating both the pilot signal carrier and the information bearing signal sidebands. Also included in a useful system is a single sideband receiver which demodulates the coded squelch signal and the single sideband information. A common configuration of a system employing single sideband equipment is shown in FIG. 1. One active single sideband transmitter 11 is depicted transmitting a message to two receivers shown as receiver 13 and receiver 16. Other inactive transmitters may populate the system and more receivers may, of course, be added to the system as desired.

A detailed block diagram of one implementation of transmitter 11 is shown in FIG. 2. In this particular implementation, which transmits a reduced carrier in addition to one sideband, the VHF transmitter output signal is created by mixing, or up-converting, a single sideband signal with a second signal. To generate the single sideband signal, the audio containing the message is filtered by the high pass filter 20 before amplitude modulating an 11.4 MHz signal generated by the 11.4 MHz local oscillator 22. One sideband of the amplitude modulated signal is selected by the single sideband filter 24 and added to an attenuated carrier, obtained from the local oscillator 22 via attenuator 26, in summer 28 to obtain a reduced carrier single sideband signal.

A second oscillator 30, at 148.020 MHz for this embodiment, is frequency modulated at a predetermined peak deviation by a low audio frequency squelch signal. This squelch signal can be, among others, a precise audio tone well known in the art in the range of 67 to 192.8 Hz or a digital code, such as that manufactured in radio products marketed by Motorola Inc. under the trademark "Digital Private Line", having a frequency spectrum substantially below 85 Hz (except for a turn-off burst at 134.4 Hz). The modulating source, regardless of its actual implementation, is depicted as coded squelch signal generator 32.

The 11.4 MHz single sideband signal is amplified in amplifier 34 and up-converted in mixer 36. It should be noted that the mixer products are all frequency modulated with the low frequency squelch signal. The upper product from the mixer 36, 159.420 MHz, is subsequently selected for transmission by filter 38.

A second embodiment of the transmitter portion of the preferred embodiment is shown in FIG. 3. In this implementation, a precise tone located in frequency above the highest, SSB modulated audio frequency (e.g. 3400 Hz) is added to the audio frequency in summer 40 after the audio is filtered by low pass filter 41. Following the single sideband filter 42, the remainder of the transmitter is identical to that of FIG. 2.

In summary, then, both transmitter embodiments transmit a signal, known as a "pilot", in addition to the audio information carried in one sideband. Both transmitters frequency modulate both the pilot and the information sideband concurrently. Modulating all components of the transmitted signal enables the receiver to remove the frequency modulation from the transmitted signal without distortion to the sideband information.

The single sideband receiver can be one of many different and well known types but with dual and noninterfering demodulation capability to be described hereinafter. Three receiver embodiments must be examined to ascertain the receiver essentialities necessary to the invention. Concentrating on FIG. 4, in which the receiver detects a reduced carrier pilot, the transmitted 159.420 MHz signal is received and converted in mixer 45 by first local oscillator 47, operating at 148.620 MHz, to a 10.8 MHz intermediate frequency (IF). The signal is filtered and amplified in filter 49 and amplifier 50 and coupled to phase detector 52, where it is mixed with the 10.8 MHz output of the voltage controlled crystal oscillator 54 (sometimes called beat frequency oscillator —BFO) to recover the transmitted audio message by a method described in U.S. Pat. No. 3,100,871. The audio is filtered by base band filter 56 in order to remove noise. The audio is then passed to an audio squelch gate 58 where it is blocked until the squelch is activated.

The voltage controlled crystal oscillator 54 tracks any frequency variation of the reduced pilot carrier within the loop tracking bandwidth defined by the filter 60 frequency response in a manner well known to those of typical skill in phase locked loop techniques. The phase locked loop formed by phase detector 52, loop filter 60, and voltage controlled crystal oscillator 54, has a closed loop bandwidth of approximately 150 Hz, which is greater than those previously used in single sideband AFC application. This bandwidth is sufficient to provide substantial tracking of both the random frequency modulation which occurs at VHF, as well as of the coded squelch modulation. A narrower loop filter would cease to track the pilot carrier frequency modulation at the higher modulation frequencies, resulting in distortion and loss of output from the higher frequency squelch signals.

The output of loop filter 60, which contains the demodulated squelch signal, is also coupled to a code decoder 62 which checks for a match between the squelch signal and an internally established signal. If a match exists, the output is "anded" with a carrier detection signal in "and" gate 64 and the audio squelch gate 58 is opened.

Automatic gain control is realized by providing a coherent detection in phase detector 66, which is driven by the voltage controlled crystal oscillator 54 via phase shift network 68. A low pass filter, 70, removes all single sideband modulation, leaving the frequency modulated carrier to be converted to a direct current control signal in a standard manner by the AGC detect and control function 72. The carrier is also detected by envelope detector 73 and checked by carrier detect comparator 74 to determine if an established reference level is exceeded. If it is, a carrier detect signal is coupled to "and" gate 64.

A second receiver embodiment, shown in FIG. 5, uses receiver mixer, first local oscillator, IF filter, and IF amplifier similar to that of FIG. 4. However, the pilot carrier and its frequency modulation are separated from the single sideband signal by carrier filter 80 which has a total bandwidth of approximately 300 Hz. The carrier is amplified by amplifier 82 and presented to mixer 84 for conversion of the single sideband signal, which was filtered by filter 86, to an audio signal. The squelch signal is recovered from the frequency modulated pilot carrier by discriminator 88 and coupled to the code detector 62. AGC is developed from the output of carrier filter 80 and processed by the AGC detect and control function 92 as described for AGC function 72. An envelope detector 94 and carrier detect comparator 74 provide a carrier detect which is "added" with a squelch code detector 62 output in "and" gate 64 to enable the audio.

Figure 6:
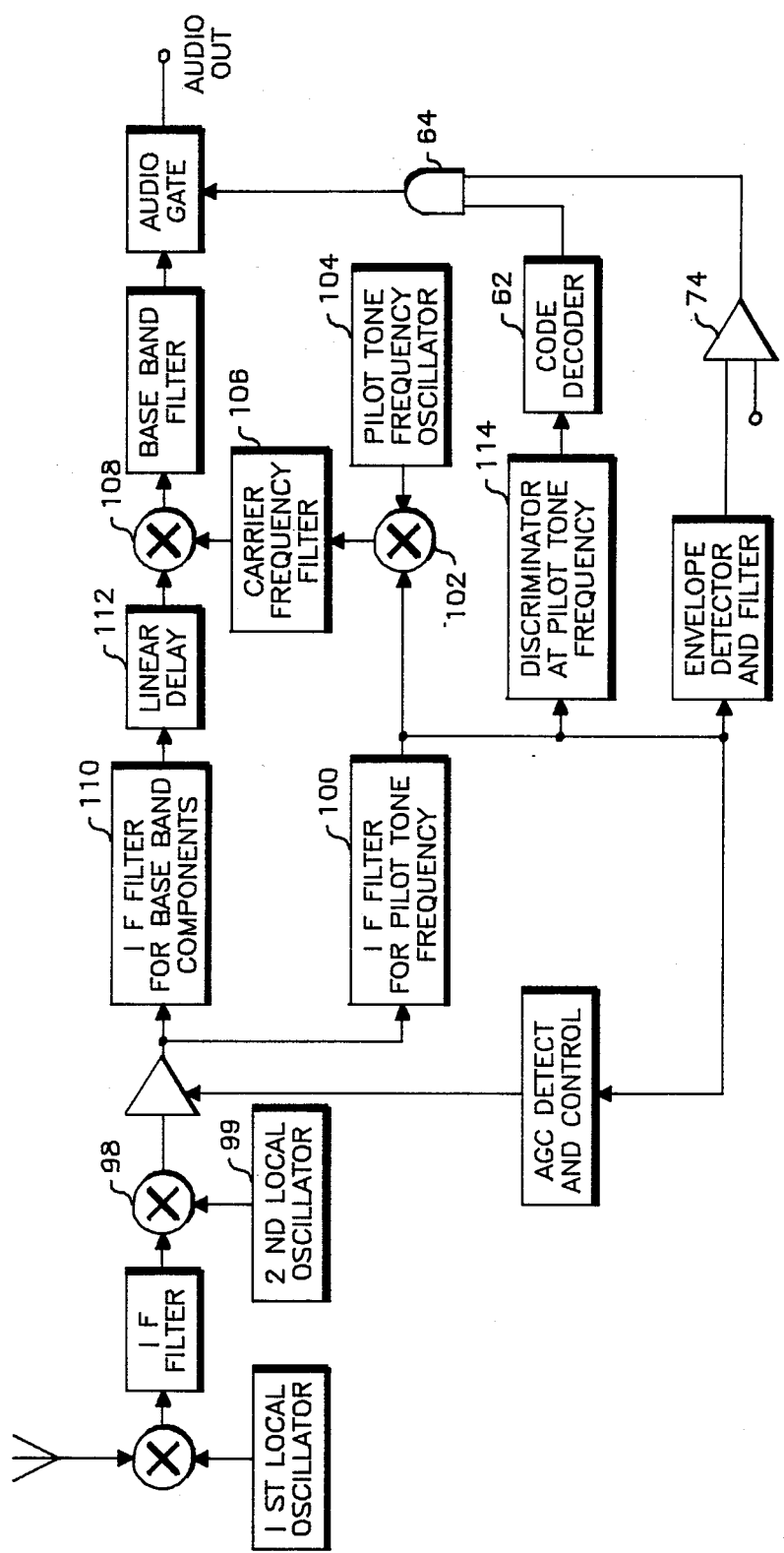
FIG. 6 is a block diagram of a single sideband pilot tone receiver which includes receiver portions of the invention.

A third receiver embodiment, shown in FIG. 6, uses a supra-audio pilot tone for its control functions. The first RF conversion is identical to that shown for previous embodiments. A second mixer 98 and second local oscillator 99 convert the signal to a second IF of 8 KHz. A pilot tone filter 100 selects a 300 Hz band of frequencies around 11.4 KHz (8 KHz IF+3.4 KHz pilot) to input to mixer 102. A pilot tone frequency oscillator 104 produces a 3400 Hz signal for input to the mixer 102 such that one output of the mixer 102 is a regenerated 8 KHz carrier. Other mixer products are removed by the carrier frequency filter 106 and the 8 KHz is input to the mixer 108. The single sideband modulated audio is filtered by the baseband filter 110 and input to mixer 108 via linear delay network 112 realized in a CCD manufactured by Reticon, Sunnyvale, Calif., under part number R5106. The SSB audio is mixed with the previously described regenerated carrier to recover the audio.

Frequency modulation of the sidebands and pilot can be removed by a receiver implementation such as that in FIG. 6. The carrier injected into mixer 108 must be equal in phase and frequency to the missing carrier so that the desired mixer output is an audio signal without frequency distortion. This is accomplished by selecting the pilot tone IF frequency with the 300 Hz wide pilot tone filter 100. (Thus any pilot tone IF frequency offset within the 300 Hz bandwidth will pass to the mixer 102). The pilot tone IF frequency is mixed with a pilot tone oscillator 104 signal and the output selected is the regenerated carrier at 0 Hz offset from the missing carrier. This remains true if the sidebands and pilot are both frequency modulated because the sidebands, the pilot, and the missing carrier maintain a constant frequency spacing. Subtracting the pilot frequency from an IF signal equivalent (the effect produced in mixer 102) yields a regenerated carrier frequency which tracks the frequency modulated sidebands. This regenerated carrier is the input to mixer 108 which demodulates the SSB audio without frequency distortion and without causing interference to the SSB audio.

The coded squelch modulation is detected from the pilot tone by discriminator 114 and processed as described for the receiver of FIG. 5.

If any of the receiver embodiments uses a tone coded squelch decoder for code decoder 62, additional circuitry may be necessary to improve signal detection in the presence of noise. A tuneable bandpass prefilter 120 having a bandwidth of 40 Hz, as diagrammed in FIG. 7, is inserted between the squelch detection circuitry and the tone decoder 122, which is a circuit manufactured by Motorola Inc. Schaumburg, Ill. with a part number of TLN4294B. It would seem obvious that to improve the squelch signal signal-to-noise all one would have to do is merely increase the deviation of the transmitted signal until a desired level at the receiver is achieved. Increasing the deviation, however, can place modulation energy outside of the PLL or carrier filter bandwidth, thereby resulting in imperfect tracking of the frequency modulation present on the pilot which will produce interference to the detected audio signal. This interference is noticeable to the user and is highly undesirable. Thus an optimum deviation can be determined at which interference remains below a specified level but which also provides an adequate signal for detection. Prefilter 120 improves the sensitivity of the receiver detection capability for tone coded signals. However, the prefilter 120, causes an increased likelihood of noise falsing. By "and" gating inputs the output of code decoder 62 and carrier detect comparator 74 the liklihood of squelch falsing is diminished significantly by requiring two events, decoder detect and carrier, to occur.

Receiver embodiments employing digital coded squelch with a phase locked loop detector do not require the prefilter 120. The noise spectrum of the coded squelch detector output with no squelch signal present is that defined by the transfer characteristic of the phase locked loop filter, which has a low frequency cutoff of approximately 6 Hz. If a digital coded squelch is employed, there is substantial correlation between adjacent bits in the presence of this low-frequency noise which may degrade the falsing performance of the code decoder, especially with certain codes. Digital squelch, like tone coded squelch, benefits from increased deviation to a maximum value. To improve falsing, the code decoder output is "and" gated with a carrier detect signal derived from the phase locked loop and AGC processing circuitry. Again it becomes unlikely that a false squelch opening would occur in both the carrier level and digital coded squelch detectors simultaneously. In order to increase the reliability of AFC acquisition during weak signal conditions, both the pilot carrier level and the deviation of the frequency modulated coded squelch signal are momentarily increased for a fraction of a second when the transmitter is initially activated. The transmitter audio input is also inhibited during this time.

While it is well known that frequency variations present on the pilot may be removed by "tracking" the pilot, it has not been obvious that an effective compromise exists in intentional pilot frequency deviation between that required to avoid disturbance to the single sideband message and that required to provide reliable squelch signal detection over noise. The existence of such a compromise has been found experimentally to exist and implemented into the equipment described herein. Specifically, it was found that a peak pilot phase deviation of 0.15 radians was suitable for any standard tone squelch frequency in the range of 67 to 192.8 Hz. An optimum deviation for the digital coded squelch was determined to be a deviation of plus or minus 34 Hz. These deviation levels yield a squelch sensitivity equal to the threshold of readability for weak audio signals and a barely perceptible degradation in audio quality for strong signals. Operation of the AFC pilot tracking is not degraded with the presence of squelch signal moduation, and frequency offsets and rapid frequency variations due to multipath signal propagation continue to be tracked without interference.

It is common to combine both a receiver and a transmitter as described hereinabefore, into a single communications package thereby allowing two-way communications. Many other variations and design choice selections may be substituted in the above described equipment without departing from the spirit and scope of the invention.

We claim:

1. A single sideband communications system for conveying a message through a transmitter to at least one predetermined receiver and employing a coded squelch signal unique to that receiver, comprising:
    means for generating and transmitting a radio frequency signal comprising a single sideband signal and pilot both angle modulated with the coded squelch signal at a predetermined deviation;
    means for receiving the radio frequency signal and tracking to predetermined limits the frequency excursions of said pilot so as to essentially eliminate frequency distortion of the message;
    means for demodulating the single sideband signal; and
    means for demodulating the coded squelch signal from said received radio frequency signal in cooperation with said frequency excursion tracking means thereby avoiding interference to said single sideband signal demodulating means and said frequency tracking means.

2. A communications system in accordance with claim 1 wherein said coded squelch signal is one of a plurality of low frequency digital bit sequences.

3. A communications system in accordance with claim 2 wherein said predetermined deviation is approximately 34 Hz.

4. A communications system in accordance with claim 1 wherein said coded squelch signal is one of a plurality of precise audio frequency signals.

5. A communications system in accordance with claim 4 wherein said predetermined deviation is 0.15 radians.

6. A communications system in accordance with claim 1 wherein said pilot is a reduced carrier.

7. A communications system in accordance with claim 1 wherein said pilot is a tone.

8. A communications system in accordance with claim 1 further comprising means for detecting the level of the pilot and correspondingly adjustng the predetermined receiver, whereby a constant level may be presented at the predetermined receiver output.

9. A communications system in accordance with claim 1 whereby said means for tracking is a phase locked loop.

10. A communications system in accordance with claim 9 wherein said phase locked loop further comprises a loop filter which outputs, inter alia, a demodulated coded squelch signal developed in tracking said frequency excursions of said pilot.

11. A communications system in accordance with claim 10 wherein said loop filter is a network with a low pass characteristic which produces a frequency response corner at about 150 Hz to select said pilot of said radio frequency signal for tracking and to define said predetermined frequency excursion limit of said radio frequency signal thereby avoiding interference to said means for demodulating the single sideband signal.

12. A communications system in accordance with claim 1 wherein said means for receiving and tracking further comprises an IF pilot bandpasss filter with a bandwidth of approximately 300 Hz.

13. A communications system in accordance with claim 12 wherein said means for demodulating the coded squelch signal is a discriminator.

14. A receiver for processing a single sideband signal and pilot additionally angle modulated with a coded squelch signal and providing an output, comprising:
    means for detecting the level of the pilot and correspondingly adjusting the receiver to effect a substantially constant level at the output of the receiver;
    means for tracking the frequency excursions of the pilot to predetermined limits thereby allowing an essentially frequency distortion free demodulation of the single sideband signal;
    means, coupled to said means for tracking the frequency excursions, for demodulating the coded squelch signal whereby interference to said single sideband signal, said tracking means, and said level detecting means is essentially avoided; and
    means for decoding and comparing the demodulated coded squelch signal to an internally stored reference thereby activating the receiver output upon a detected match.

15. A receiver for a single sideband communications system in accordance with claim 14 wherein said coded squelch signal is one of a plurality of low frequency digital bit sequences.

16. A receiver for a single sideband communications system in accordance with claim 14 wherein said coded squelch signal is one of a plurality of precise audio frequency signals.

17. A receiver for a single sideband communications system in accordance with claim 14 wherein said pilot is a reduced carrier.

18. A receiver for a single sideband communications system in accordance with claim 14 wherein said pilot is a tone.

19. A receiver for a single sideband communications system in accordance with claim 14 wherein said means for tracking is a phase locked loop.

20. A receiver for a single sideband communications system in accordance with claim 19 wherein said phase locked loop further comprises a loop filter which outputs, inter alia, a demodulated coded squelch signal developed in tracking said reduced carrier.

21. A receiver for a single sideband communications system in accordance with claim 20 wherein said loop filter is a network with a low pass characteristic which produces a frequency response corner at about 150 Hz to select a portion of said radio frequency signal for tracking and to define said predetermined frequency excursion limit thereby avoiding interference to said single sideband signal.

22. A receiver for a single sideband communications system in accordance with claim 14 wherein said means for tracking further comprises an IF pilot bandpass filter with a bandwidth of approximately 300 Hz.

23. A receiver for a single sideband communications system in accordance with claim 22 wherein said means for demodulating the coded squelch signal is a discriminator.

24. A transmitter for transmitting a message and a coded squelch for enabling at least one predetermined receiver in a single sideband communications system, comprising:
    means for creating a single sideband signal modulated by the message;
    means for generating a pilot and combining it with said single sideband signal;
    means for further combining said combined signal with a coded squelch signal to derive a single sideband radio frequency signal angle modulated at a predetermined deviation with said coded squelch signal; and
    means for transmitting said radio frequency signal.

25. A transmitter in accordance with claim 24 wherein said coded squelch signal is one of a plurality of low frequency digital bit sequences.

26. A transmitter in accordance with claim 25 wherein said predetermined deviation is approximately 34 Hz.

27. A transmitter in accordance with claim 24 wherein said coded squelch signal is one of a plurality of precise audio frequency signals.

28. A transmitter in accordance with claim 27 wherein said predetermined deviation is 0.15 radians.

29. A transmitter in accordance with claim 24 wherein said pilot is a reduced carrier.

30. A transmitter in accordance with claim 24 wherein said pilot is a tone.

31. A method of enabling by coded squelch at least one predetermined receiver to receive a single sideband modulated message from a transmitter and deliver the message to an output, comprising the steps of:
    deriving a radio frequency signal comprising a pilot and the message carrying single sideband signal angle modulated with the coded squelch signal at a predetermined deviation;
    transmitting the resulting radio frequency signal;
    receiving and tracking the frequency excursions of said pilot of said radio frequency signal to predetermined limits;
    demodulating the single sideband modulated message essentially frequency distortion-free as a result of said frequency excursion tracking; and
    demodulating said coded squelch signal from said radio frequency signal essentially without interference to said single sideband message demodulating step as a result of said frequency tracking step.

32. A method in accordance with the method of claim 31 wherein said coded squelch signal is one of a plurality of low frequency digital bit sequences modulated at a predetermined deviation of approximately 34 Hz.

33. A method in accordance with the method of claim 31 wherein said coded squelch signal is one of a plurality of precise audio signals modulated at a predetermined deviation of approximately 0.15 radians.

34. A method in accordance with claim 31 further comprising the step of detecting the level of carrier of said single sideband signal and correspondingly adjusting the receiver to present a constant level at the receiver output.

35. A method in accordance with the method of claim 31 wherein said pilot is a reduced carrier.

36. A method in accordance with the method of claim 31 wherein said pilot is a tone.

* * * * *